Jan. 3, 1928.
C. C. PFLEEGOR
1,655,335
CONVEYER BELT IDLER
Filed Feb. 9, 1926
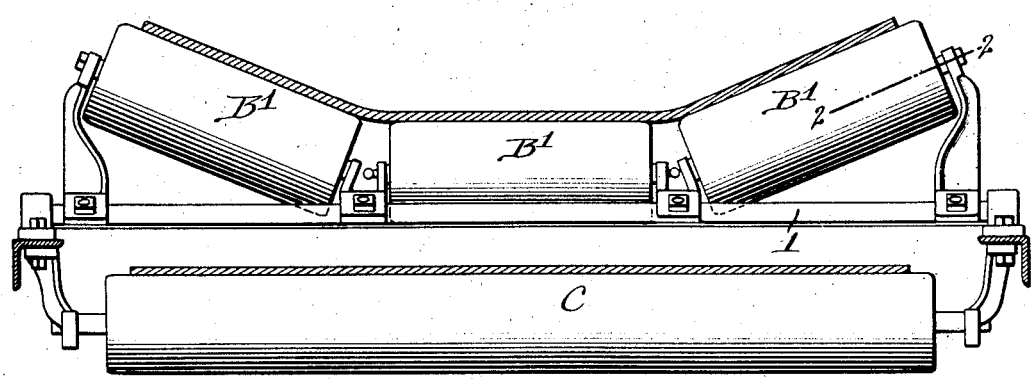
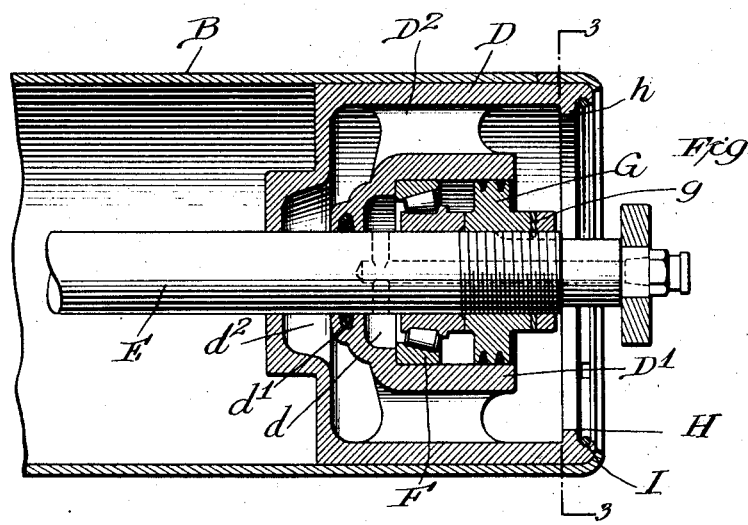
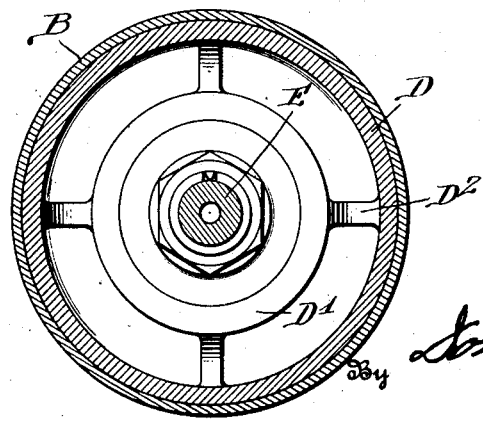
Inventor
C. C. Pfleegor Patented Jan. 3, 1928.

1,655,335

UNITED STATES PATENT OFFICE.

CORDEEN C. PFLEEGOR, OF MUNCY, PENNSYLVANIA, ASSIGNOR TO SPROUT, WALDRON & CO., OF MUNCY, PENNSYLVANIA, A CORPORATION OF PENNSYLVANIA.

CONVEYER-BELT IDLER.

Application filed February 9, 1926. Serial No. 87,194.

This invention relates to conveyer belt idlers, and more particularly to anti-friction bearing heads for the rollers of conveyer belt idlers.

Conveyer belt idlers as heretofore constructed have had cast iron heads inserted and secured in the ends of the rollers; said heads each consisting of a cylindrical body cast integrally with a centrally disposed substantially cup-like bearing member connected therewith by a continuous annular web separating it from said bearing member; the latter having an opening through its closed end adapted to fit on a shaft on which the roller is mounted; said cup-like member having an annular roller-bearing inserted in its open end and secured therein against a shoulder near its closed end by means of a nut or washer screwed on the shaft and closing said open end, a suitable annular space or chamber for grease or lubricating material being provided between the closed end of said member and said nut, so as to form what is known as a seal to prevent grease from escaping and finding its way into the interior of the roller, but in practice it has been found that the grease gun used to insert the lubricant will force the grease under and past the seal, so as to enable it to escape into the roller and lodge therein, thus placing the roll in an unbalanced condition.

The object of my invention is to overcome the foregoing objections to conveyer belt idlers as heretofore constructed, and to provide a roller-bearing of the character referred to having a double seal, so that grease which escapes from the first seal can work its way out and escape through the open end of the roller instead of finding its way into the roller and lodging therein.

The invention will first be hereinafter more particularly described, with reference to the accompanying drawings, which are to be taken as a part of this specification, and then pointed out in the claims at the end of the description.

In said drawings, Fig. 1 is a transverse section of a conveyer belt idler-supporting frame showing in side elevation a conveyer belt idler embodying my invention mounted on said frame;

Fig. 2 is a vertical longitudinal sectional view of a broken away end-portion of one of the rolls of a conveyer belt idler embodying my invention; the section being taken on the line 2—2 of Fig. 1; and Fig. 3 is a transverse section taken on the line 3—3 of Fig. 2.

Referring to said drawings, in which the same reference letters or numerals are used to denote corresponding parts in different views, A denotes the base member of a supporting frame on which is mounted the rollers B, $B^1$, of the conveyer belt idler arranged to support the upper run of the belt; the shafts of the rollers being secured at opposite ends to suitable brackets or standards on said frame with the central or middle roller B arranged in a substantially horizontal plane and the outer rollers $B^1$ extending upwardly in opposite directions at an obtuse angle to said central roller. The lower run of the belt is supported upon a roller C, which is revolubly supported below the rollers B and $B^1$ by means of supporting arms or brackets depending from the frame on which the rollers B and $B^1$ are mounted. The frame may be of the form shown or any suitable construction and as it forms no part of my invention, further description thereof appears to be unnecessary. In each end of each of the rollers which support and guide the conveyer belt is inserted and secured a cast iron or other suitably formed head containing an anti-friction or roller-bearing; said head comprising outer and inner substantially cup-like members D and $D^1$, each open at one end and having its closed end bulged outwardly and provided with a central circular opening of sufficient size to receive and fit snugly on a shaft E, which is non-rotatively secured in suitable brackets or standards on the machine frame by any suitable means such as are ordinarily employed for similar purposes. Within the inner cup-like member $D^1$ of the roller head or casing member is secured an annular roller or anti-friction bearing F consisting preferably of concentric rings having inclined confronting bearing surfaces between which are confined a row of conical rollers, and between said annular bearing and the closed end of the cup-like member $D^1$, sufficient space is provided to form an annular chamber d around the shaft E to receive and hold grease or other lubricating material. To prevent as far as possible the grease or other lubricant from escaping between the shaft and said closed end, the joint therebetween is sealed by suitable packing material placed in an annular groove or channel $d^1$ formed around the central opening in the closed end of the member $D^1$. The seal thus provided I call the first seal. The shaft E is threaded near its outer end as shown and has screwed thereon a nut or collar G of sufficient size to close the open end of the cup-like member $D^1$ and confine the annular roller-bearing F between it and a shoulder or abutment within the member $D^1$ adjacent the chamber for holding grease or other lubricating material; said nut or collar having a groove or grooves in its periphery to receive packing material to seal the joint between it and the inner wall of the bearing member $D^1$ and being secured against rotation by means of a spline-and-groove connection with the shaft E, or by means of a pin $g$ inserted through a hole in the hub of the collar and protruding into a longitudinal groove in the shaft, as indicated by full and dotted lines in Fig. 2. The outwardly bulged and closed end of the outer cup-like member D of the head is separated from the closed end of the inner member sufficiently to provide an annular space or chamber $d^2$ extending around the shaft to receive any grease or lubricating material that may escape from the chamber $d^1$ along the shaft, thus forming what I term a second seal, to prevent grease or other lubricant from escaping into the interior of the roller. The two members D and $D^1$ are rigidly connected together in spaced relation by means of spaced connecting portions or spokes $d^3$ which are preferably formed integrally therewith, so as to provide a passage-way through which grease escaping past the first seal can work its way out with ease to the end of the roll.

The heads may be secured in the ends of the tubes by means of bolts or rivets inserted through registering holes therein, but preferably the end of the tube is bent or spun around the outer end of the outer cylindrical member D of the head, and to prevent the latter from turning it may be secured to the tube by drilling a hole through the outer end portions of the tube and head and pouring welding material therein, the latter being ground off flush with the outer surface of the tube. To prevent dust or dirt from entering the open end of the head a closure plate or annulus H having a central opening therein through which the end of the shaft E is inserted, is fitted within the open end of the cylindrical member D of the head so as to bear against a rib or abutment $h$ on the inner side of said member and may be held in place by means of a split ring I sprung into an annular groove on the inner side of the outer cylindrical member D of the head adjacent the annular rib or abutment $h$ between which and said split ring said closure plate is removably secured.

In practical use grease or other lubricant is forced into the bearing member $D^1$ by means of an alemite gun or the like, and the pressure is usually sufficient to cause some of the grease to escape past the first seal, but on entering the chamber $d^2$ the pressure is immediately released, so that the grease can work its way out with ease through the passages between the spokes $D^2$, following the line of least resistance to the end of the roll, and any air pressure exerted by the alemite gun and passing thru the first grease seal would naturally follow said line of least resistance and take the grease with it.

Having thus described my invention, what I claim as new and desire to secure by Letters Patent of the United States is:

1. A roller for conveyer belt idlers comprising a tube having inserted in the end thereof a head having inner and outer substantially cup-like members connected together in spaced relation by spaced connecting portions; each of said members having a central opening in its closed end of sufficient size to adapt it to fit snugly on a shaft on which the roller is mounted, the closed ends of said members being spaced apart so as to provide an open space between said ends around the closed end of the inner member in communication with the space between the peripheral portions of said members, said inner member having an anti-friction bearing housed therein, and means for sealing the closed ends of said members around the shaft so as to prevent grease or other lubricant from escaping along the shaft and entering the interior of the roller.

2. A roller for a conveyer belt idler comprising a tube having inserted and secured in each end a head having outer and inner members of substantially cup-like form connected together in spaced relation by integral spaced connecting portions; each of said members having a circular opening in its closed end of sufficient size to adapt it to fit snugly on a shaft on which the roller is mounted; the closed ends of said members being separated sufficiently to provide an open space around the closed end of the inner member in communication with the space between the peripheral portions of the two members leading to the open end of the head; said inner member having an annular anti-friction bearing secured therein and a removable closure for its open end, and also having a chamber for grease or other lubricant between its closed end and said bearing and means for sealing its closed end around the shaft so as to prevent lubricant from escaping along the shaft into said open space.

3. A roller head comprising outer and inner cylindrical members adapted for insertion in the end of a tube, said members being connected together in spaced relation by radially extending connecting portions and each open at one end and having in its other end a central opening of sufficient size to adapt it to fit snugly on a shaft on which the roller is mounted, the closed ends of said members being spaced apart to provide an annular space around the closed end of the inner member, and the latter having an anti-friction bearing housed therein and an annular grease holding chamber between said bearing and its closed end, and means for sealing the closed ends of said members so as to prevent grease from escaping into the interior of the roller.

4. In a roller for conveyer belt idlers composed of a tubular member with heads inserted and secured in the ends of the tube, a head consisting of cylindrical members with closed inner ends and open outer ends; said members being joined together in spaced relation by integral spaced connecting portions so as to provide a space for lubricant around the closed end of the inner member and a passage leading from said space through which the lubricant can work its way out from between said closed ends to the opposite open ends of said members; said inner member having a removable closure for its open end and adapted to contain an annular anti-friction bearing therein arranged between said closure and its closed end, and means to prevent lubricant from escaping along the shaft from said space into the interior of the roller.

5. A roller head comprising outer and inner cylindrical members each open at one end and closed at the other end thereof and provided with a central opening of sufficient size to adapt it to fit snugly on a shaft on which the roller is mounted; said members being rigidly connected together in spaced relation and having the closed ends thereof separated sufficiently to provide an annular space between the closed ends of the two members; said inner member being constructed to contain an anti-friction bearing and having an annular grease holding chamber therein arranged between its closed end and said bearing, means to prevent lubricant from escaping through the closed end of said outer member into the interior of the roller, and detachable means for closing the open ends of said members.

In testimony whereof I affix my signature.

CORDEEN C. PFLEEGOR.